Patented Mar. 13, 1923.

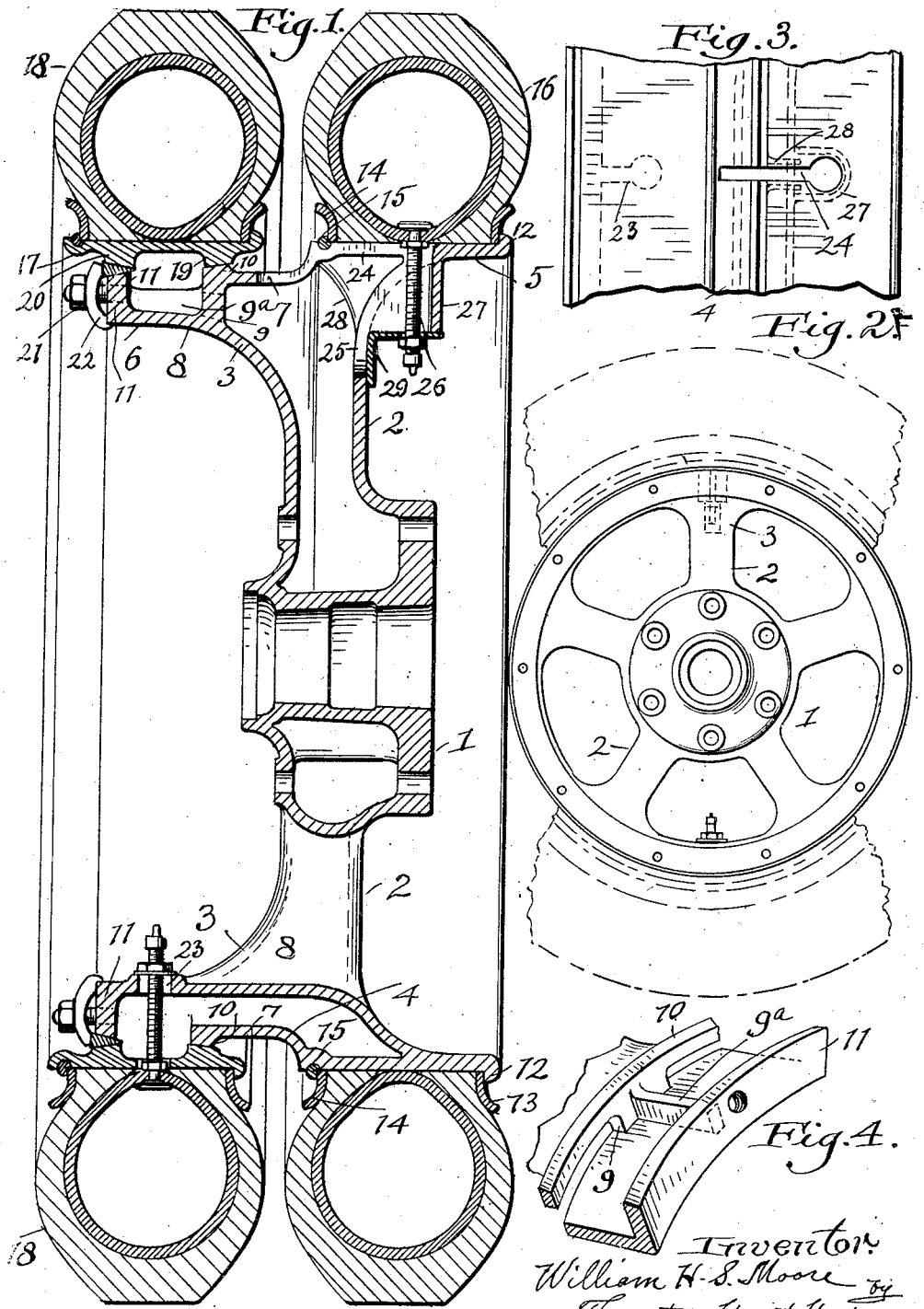

1,448,144

UNITED STATES PATENT OFFICE.

WILLIAM H. S. MOORE, OF CLEVELAND, OHIO.

TRUCK WHEEL.

Application filed April 10, 1922. Serial No. 550,972.

*To all whom it may concern:*

Be it known that I, WILLIAM H. S. MOORE, a citizen of the United States, residing at Cleveland, in the county of Cuyahoga and State of Ohio, have invented a certain new and useful Improvement in Truck Wheels, of which the following is a full, clear, and exact description.

This invention relates to wheels for trucks and more particularly to wheels of the dual pneumatic type, in which a pair of pneumatic tires are mounted side by side on the wheel.

The main object of the invention is to provide a means for mounting the two tires upon a truck wheel which will permit the tires to be readily removed and replaced without detaching the wheel from its axle.

A further object is to provide nipple receiving slots in the peripheral portion of the wheel in such a manner as to avoid weakening the wheel.

Generally speaking, the invention may be said to comprise the elements and combinations thereof set forth in the accompanying claims.

In the annexed drawing forming a part of this specification, Fig. 1 shows an axial section through the wheel; Fig. 2 is a fragmentary side elevation of the wheel; Fig. 3 is a fragmentary detail view showing the tire valve stem receiving slots; Fig. 4 is a fragmentary detail view showing the felloe construction.

Referring to the annexed drawing, the wheel comprises a hub 1, hollow radial spokes 2 having enlarged flaring outer ends 3 and a tire supporting annulus 4, all cast integrally. The annulus 4 has a cylindrical rim portion 5 on the inner side of the wheel and an inwardly offset portion 6 of smaller diameter on the outer side of the wheel. The inwardly offset portion 6 comprises a portion 7 extending outwardly from the rim portion and forming a continuation thereof, and a felloe portion 8 merging into the enlarged outer ends 3 of the spokes 2 and extending inwardly between the spokes to the inner edges thereof near the center of the rim portion 5. The felloe portion 8 is spaced inwardly from the rim extension 7 and forms therewith a shallow hollow felloe. Opposite each of the spokes 2 spaced integral stiffening webs 9 are formed between the outer edge of the rim extension 7 and the felloe portion 8. Along the outer edge of the rim extension 7 is a wedge rib 10 forming the inner seat for a demountable rim. On the outer edge of the felloe portion 8 is a similar wedge rib 11 forming the outer seat for a demountable rim. The reinforcing webs 9 are preferably located opposite the bolt holes in the rib 11 which receive the demountable rim clamping bolts, and ribs $9^a$ on the felloe portion 8 connect the webs 9 and rib 11 adjacent each of the bolt holes to stiffen the felloe at these points. The webs 9 are formed by suitable apertures in the said mold core and the openings between the webs 9 permit the core to be broken out from the interior of the spokes.

The rim portion 5 of the tire supporting annulus 4 has a circumferential edge rib on the inner side of the wheel which serves to retain a tire retaining flange ring 13. On the side toward the outside of the wheel a removable flange ring 14 is secured in place upon the rim portion by a split retaining ring 15 seated in a circumferential groove in the rim portion 5. A pneumatic tire 16 is secured upon the rim portion 5 by means of the removable flange rings 13 and 14.

A demountable rim 17 having a tire 18 removably mounted thereon is secured upon the inwardly offset portion of the annulus 4. The demountable rim 17 has an inner circumferential wedge rib 19 formed to engage upon the wedge rib 10 on the rim extension 7 and an outer wedge rib 20 adapted to be disposed over the rib 11 on the felloe 8, the inclination of the inner face of the rib 20 being opposite to that of the outer face of the rib 11. A wedge ring 21 is clamped between the ribs 11 and 20 and is held in place by the usual bolt clips 22 to retain the demountable rim 17 upon the wheel.

A key-hole slot 23 extends inwardly from the outer edge of the felloe 8 to receive the valve stem of the tire 18 carried by the demountable rim 17. At the outer end of one of the spokes 2 and communicating with the interior thereof is a transverse slot 24 in the annulus 4 extending from the inner side of the rim seating rib 10 to the center of the rim portion 5. The spoke 2 with the interior of which the slot 24 communicates has a radial slot 25 at its outer end in alignment with and forming a continuation of the slots 24 to permit the valve stem 26 of the tire 16 to pass from the interior of the spoke through the wall thereof on the inner side. The valve stem 26 when the tire 16 is in place extends through the boss 27 integral with the rim portion 5 and spoke 2.

The outer tire 18 can either be removed from the rim 17 while it is in place on the wheel or the rim 17 with the tire 18 thereon can be removed from the wheel. To remove the tire from the rim portion 5 the demountable rim 27 is removed and the flange ring 14 detached from the rim portion 5. The rim seat of reduced diameter at the outer side of the wheel permits the tire 16 to be readily removed from or placed upon the rim portion 7.

In placing the tire 16 in place upon the rim portion 7 the valve stem 26 is inserted into the outer end of the slot 24 and the tire is pushed inwardly onto the rim portion 7, the slots 24 and 25 permitting the stem 26 to move through the wall of the spoke 2 into position on the inner side of the spoke. By placing the slot 24 across the outer end of a spoke, the wheel is not appreciably weakened. The valve stem receiving slot 23 for the tire on the demountable rim is preferably offset circumferentially with respect to the valve stem receiving slot 24 for the inner tire.

The rim portion 5 is further strengthened adjacent the slots 24 by ribs 28 inside the enlarged end 3 of the spoke 2, integral with the rim portion 5 on opposite sides of the slot 24 and with the end portion 3 of the spoke 2 on opposite sides of the slot 25, the ribs 28 serve also as a guideway for the valve stem in its movement from the outer end of the slot 24 into the boss 27. An angle cover plate 29 is clamped by a nut on the valve stem 26 upon the lower open end of the boss 27 and over the lower end of the slot 25.

Having described my invention, I claim—

1. A truck wheel comprising a wheel body, a fixed inner tire receiving rim thereon, a detachable tire retaining flange on the inner side of said fixed rim, outwardly extending rim supporting means on said wheel body and a demountable tire receiving rim secured on said outwardly extending supporting means.

2. A truck wheel, comprising a wheel body having a fixed tire receiving rim thereon, said rim being provided with an inner detachable flange ring, and a demountable rim at one side of said fixed rim of the same external diameter as said fixed rim.

3. A cast metal truck wheel, comprising a hub, spokes and felloe cast integrally, said felloe having a tire supporting rim integral therewith on one side and a seat portion of less diameter than said rim at one side of said rim, said seat being adapted to receive a demountable tire supporting rim.

4. A truck wheel, comprising a wheel body, and a tire carrying annulus, fixed to said body, said annulus being formed to provide a tire receiving rim portion on one side of the wheel and a portion offset inwardly to a smaller diameter on the opposite side of the wheel, inwardly offset portion having a seat thereon for a demountable rim, and said annulus having a transverse valve stem receiving slot extending from inside said rim seat to the center of said rim portion.

5. A truck wheel, comprising a wheel body having hollow metal spokes, and a tire carrying annulus fixed to said spokes, said annulus being formed to provide a tire receiving rim portion on the inner side of the wheel and a portion offset inwardly to a smaller diameter on the outer side of the wheel, said rim portion overhanging the inner side of the wheel body with the central plane thereof on the inner side of said spokes, said inwardly offset portion having a seat thereon for a demountable rim, said annulus having a valve stem receiving slot communicating with the interior of a spoke and extending from the inwardly offset portion to the center of the rim portion, and said spoke with which said slot communicates having a slot aligned with said first mentioned slot to permit the valve stem to pass through the wall of the spoke.

6. A truck wheel, comprising a wheel body, and a tire carrying annulus fixed to said body, said annulus being formed to provide a tire receiving rim portion on one side of the wheel and a portion offset inwardly to a smaller diameter on the opposite side of the wheel, said inwardly offset portion having a seat thereon for a demountable rim and a valve stem receiving slot in its outer edge, and said annulus having a transverse valve stem receiving slot extending from inside said rim seat to the center of said rim portion, said valve stem receiving slots being circumferentially offset with respect to each other.

7. A cast metal truck wheel, comprising a wheel body having hollow spokes and a tire receiving annulus integral therewith, said annulus consisting of a tire receiving rim portion on the inner side of the wheel and a portion offset inwardly to smaller diameter on the outer side of the wheel, said spokes having enlarged outwardly flaring upper ends extending on the inner side of the wheel to adjacent the center of the rim portion of the annulus, said inwardly offset portion of the annulus having a seat thereon adapted to support a demountable rim, said annulus having a transversely extending valve stem receiving slot communicating with the interior of a spoke and extending from the inwardly offset portion to the center of the rim portion, and said spoke with which said slot communicates having a slot aligned with the slot in the annulus to permit the valve stem to pass through the wall of the spoke.

8. A cast metal wheel having a hub, hollow spokes and hollow felloe portion cast integrally, said felloe portion having inner and outer spaced walls, said inner wall forming a continuation of the walls of said spokes whereby the interior of said felloe is in communication with the interior of said spokes, and spaced integral stiffening ribs between said inner and outer felloe walls adjacent the spokes, said felloe having an exterior circumferential opening on the outer side of said webs.

In testimony whereof, I hereunto affix my signature,

WILLIAM H. S. MOORE.